United States Patent [19]

Jackman

[11] Patent Number: 4,726,702

[45] Date of Patent: Feb. 23, 1988

[54] FITTING

[75] Inventor: John C. Jackman, Bennettsbridge, Ireland

[73] Assignee: Keelglen, Ltd., Kilkenny, Ireland

[21] Appl. No.: 824,477

[22] Filed: Jan. 31, 1986

[51] Int. Cl.⁴ .......................... B25G 3/34; F16B 11/00
[52] U.S. Cl. ...................................... 403/272; 403/270
[58] Field of Search ................. 403/272, 271, 270; 228/169, 165, 210, 255

[56] References Cited

U.S. PATENT DOCUMENTS

| | | | |
|---|---|---|---|
| 582,138 | 5/1897 | Hedenberg et al. | 403/272 |
| 1,132,442 | 3/1915 | Clawson | 403/271 X |
| 1,382,607 | 6/1921 | Rathbone et al. | 403/272 X |
| 2,141,107 | 12/1938 | Greulich | 403/272 X |
| 2,263,166 | 11/1941 | Darvie et al. | 403/272 |
| 2,880,021 | 3/1959 | White | 285/328 |
| 2,990,203 | 6/1961 | Grover et al. | 403/272 X |

FOREIGN PATENT DOCUMENTS 552394 11/1956 Belgium .
113590 10/1897 Fed. Rep. of Germany .
865472 4/1961 United Kingdom .

OTHER PUBLICATIONS

Patents Abstracts of Japan, vol. 7, No. 179, (M-234) (1324), Aug. 1983, & JP-A-58 81 559 (Toyota Jidosha Kogyo K.K.) 16-05-1983.

*Primary Examiner*—Andrew V. Kundrat
*Attorney, Agent, or Firm*—Pollock, Vande Sande & Priddy

[57] ABSTRACT

A fitting for connecting elongate elements, such as tubing, comprises a body 1 and legs 2a and 2b which fit into tubes A and B. The legs 2a and 2b are provided with recesses 4 for receiving bonding inserts 5 which contain bonding medium, for example, solder 6. The inserts 5 are of a material compatible with materials of the tubs A and B. When heat is applied to the external surface of the tubes A and B, in the region of the legs 2a, 2b, the solder 6 melts and bonds the inserts 5 to the tubes A and B.

9 Claims, 6 Drawing Figures

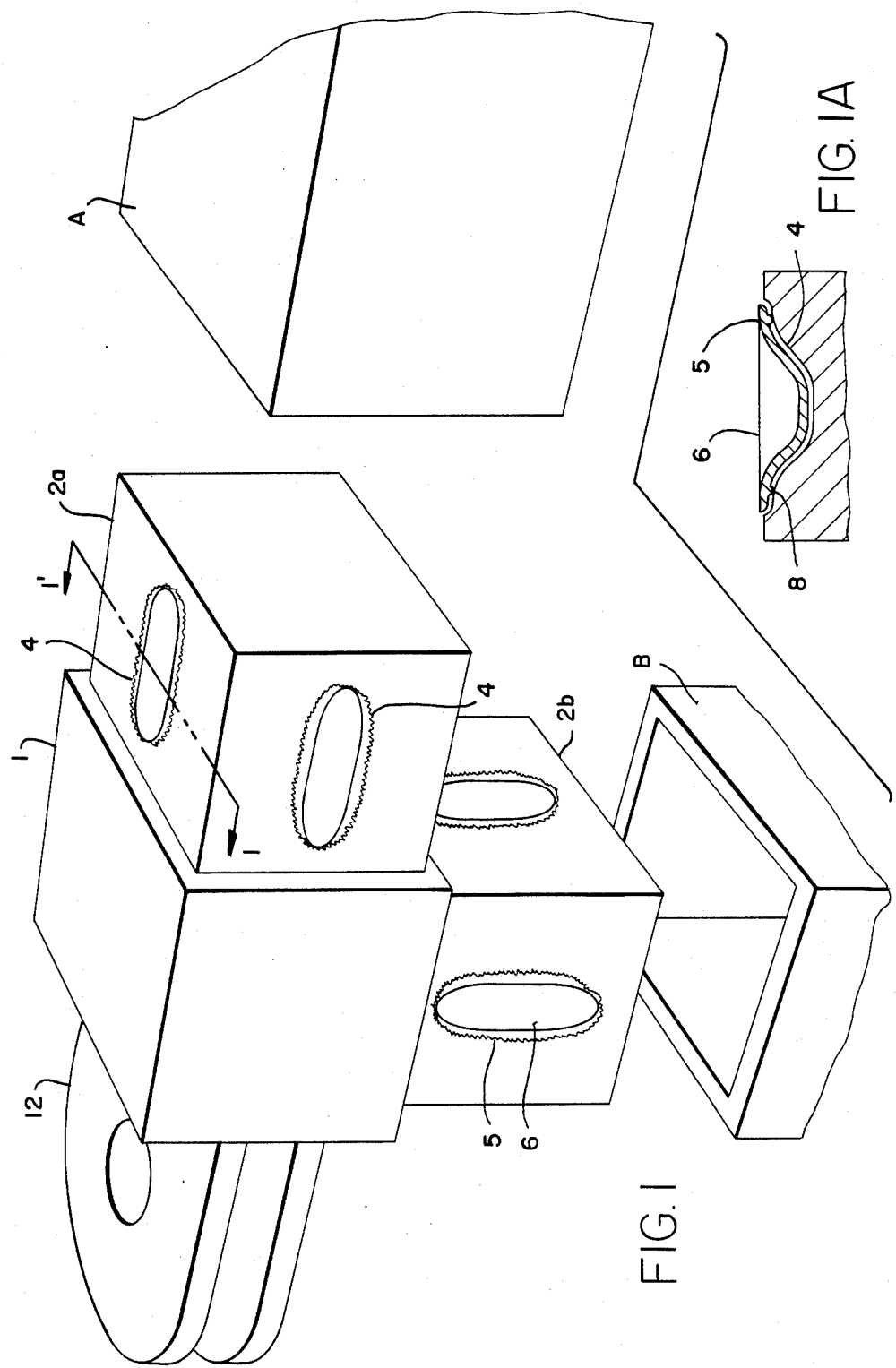

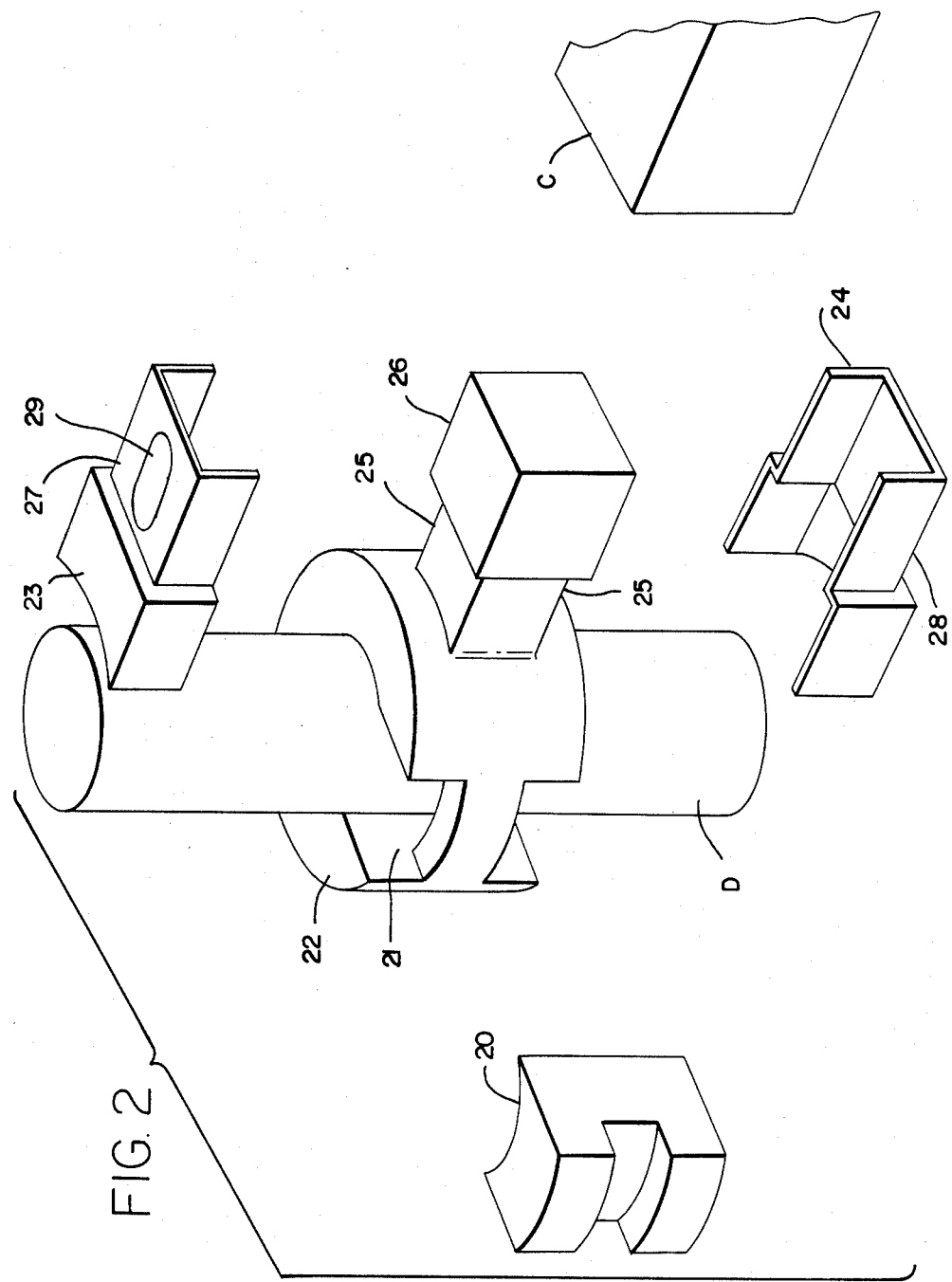

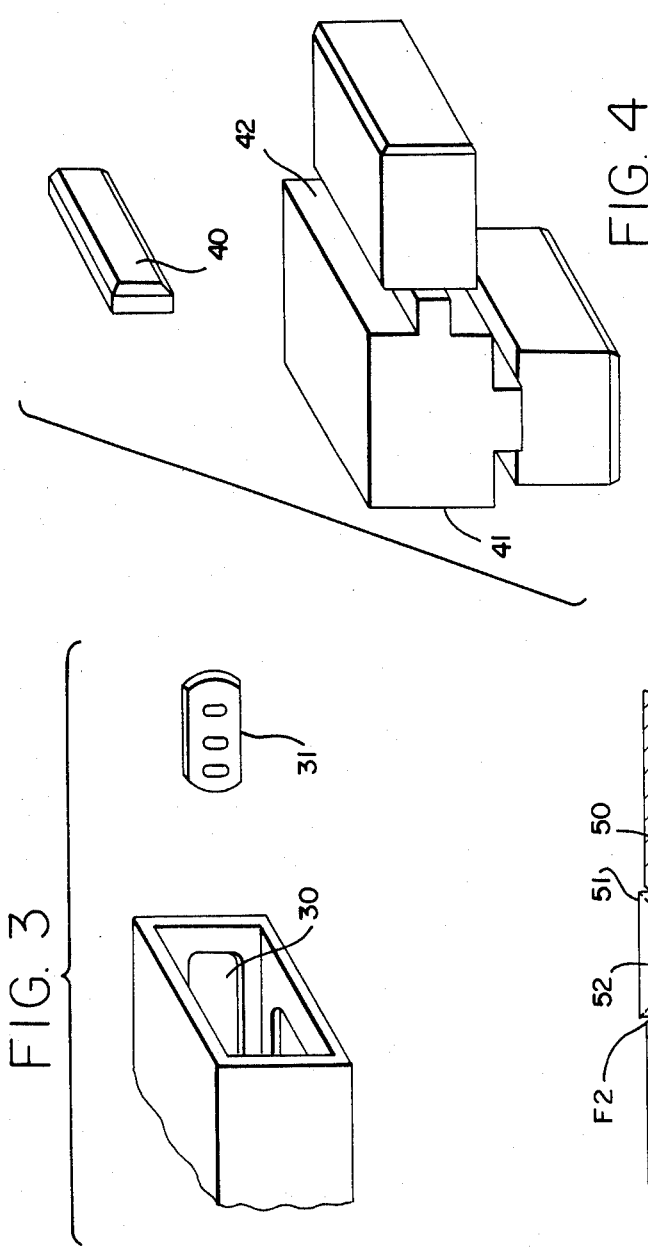

FITTING

BACKGROUND OF INVENTION

The present invention relates to a fitting which facilitates the assembly of structures such as furniture, scaffolding, and display stands from lengths of elongate elements, such as tubing.

The assembly of such structures using metal tubing, has been done by welding the lengths together at the junctions. Welding the ends of tubing together to form a junction presents difficulties. One difficulty is that the piping or tubing may collapse inwardly during welding. Another difficulty is that the appearance of the junction may be unsatisfactory. A further difficulty is that welding is time consuming and expensive.

There are a number of different types of joints or fittings on the market to enable lengths of tubing to be joined together without welding. These fittings are intended to receive the ends of lengths of tubing and to secure them using mechanical fixing means. These joints are expensive and complicated.

SUMMARY OF THE INVENTION

It is an object of the present invention to provide devices for assisting in the assembly of structures of the type mentioned, which devices are simple and inexpensive and provide a strong joint between elongate elements.

The present invention provides a fitting for connecting elongate elements to form a structure, the fitting comprising a body; means on the body for accommodating a bonding insert of a material compatible with that of the elongate element or that it is capable of being joined to an elongate element by adhesion or fusion; and means for engaging the fitting with the elongate elements, whereby on the application of thermal or electrical energy to the fitting, a bond is formed between the insert and an elongate element.

Advantageously, the fitting includes a bonding insert comprising a base and a bonding medium which upon application of heat to the fitting, bonds the insert to an elongate element. The bonding medium may be an adhesive or solder.

The invention also provides a fitting for an elongate element comprising a body, fixing means to fix the body within the elongate element, and internal means within the body for accommodating a fastening element.

The invention will now be more particularly described with reference to the accompanying drawings which show by way of example only, a number of embodiments according to the invention. In the drawings:

BRIEF DESCRIPTION OF THE DRAWINGS

FIG. 1 is a perspective view of the first embodiment of a fitting for use in joining two mutually perpendicular square cross-section tubes, and including a hinge;

FIG. 1a is a section view on 1—1' of FIG. 1;

FIG. 2 is a partially exploded perspective view of a second embodiment of a fitting including bonding inserts, for joining one end of a square cross-section tube at right angles to a round cross-section pipe intermediate the ends of the pipe;

FIG. 3 is a perspective view of a third embodiment showing one end of the fitting, and an insert, the fitting being an external fitting, i.e. the end of the fitting is placed over the end of the tubing.

FIG. 4 is a perspective view of a fourth embodiment of a fitting for joining tubing; and FIG. 5 is a cross-sectional side view of a fifth embodiment of a fitting according to the invention.

DESCRIPTION OF THE PREFERRED EMBODIMENTS

Referring initially to FIG. 1, the first embodiment comprises a structural body 1, manufactured as a single aluminium alloy casting and including legs 2a and 2b which fit into mild steel tubes A and B. The legs 2a, 2b are provided with recesses 4 for receiving bonding inserts 5 which contain solder 6. The bonding inserts 5 are of the same material as the tubes A and B. The ends of square section tubes A and B may each be fitted over the legs 2a, 2b so that their respective end edges abut the shoulder defined by the body 1 and legs 2a, 2b. Heat is then applied by means of a blow torch to the external surface of the tubes A and B in the region of the legs 2a, 2b, causing the solder 6 to melt thereby bonding the inserts 5 to the tubes A and B. In the drawings of the first embodiment, it will be noted that the edges of the inserts 5 are serrated. The serrations engage the side walls of the recess 4 to assist in locating the inserts 5 and may be used to rivet the inserts in position, when the fittings are used in high stress applications. In normal light engineering applications, however, a press fit of the inserts 5 into the recesses 4 will provide sufficient anchorage of the inserts 5 in the recesses 4.

Referring now to FIG. 1a, it will be noted that the insert 5 is provided with resiliently deformable dimples 8. The dimples 8 cause the insert 5 and solder 6 to stand just proud of the surface of the legs 2a, 2b, so that when the tubes A and B are put in position, a good contact is achieved between the solder 6 and the tubes.

The provision of a fitment in the form of part of a hinge 12 on the body 1 illustrates just one of the number of uses to which the fittings may be put.

The second embodiment is illustrated in FIG. 2. One end of a horizontally extending square cross sectional tube C is to be joined to a vertically extending round cross sectional pipe D, intermediate the ends of the pipe D. As the pipe D is manufactured from mild steel, a mild steel insert 20 is first inserted into the recess 21 provided on cast iron collar 22. The collar 22 is fitted over one end of pipe D and is moved along the pipe member to the desired position and the insert 20 is welded to the pipe D.

Inserts 23, 24 containing solder 29 are then put in position in recesses 24, the horizontal tube C is slid over the leg 26 and partially over inserts 23, 24 to abut shoulders 27,28 on the inserts. Heat is then applied to join the horizontal tube C to the inserts 23, 24.

The third embodiment illustrated in FIG. 3 illustrates one end of a fitting which fits over a tube. Each internal recess 30 accommodates a bonding insert 31.

The fourth embodiment illustrated in FIG. 4 is a further example of a fitting in which the inserts 40 are welded to the tubes. The inserts 40 are retained on the body 41 in slots 42.

The fifth embodiment shown in FIG. 5 comprises a body 50 inserted laterally in a tube F which is provided with two holes F1 and F2. Hole F1 is large enough to allow the fitting to be pushed into the tube F and hole F2 is of a size to accommodate the head 51 of the fitting. The head 51 is rivetted or peened in position. The body 50 is provided with means to accommodate engineering fasteners. The examples of such means shown in FIG. 5 are screwtheading 52 for a bolt and a plug 53 to accommodate a screw.

The fitting described in this specification and the elongate elements may be of metal, plastics or ceramic material.

The fittings of the invention may be provided with various other fitments for all possible light engineering situations, not illustrated herein.

Instead of using solder in the boding inserts, a heat curing adhesive may also be used as a bonding medium. A suitable adhesive is a two pot epoxy resin, an example of which is sold under the Trade Mark ARALDITE.

I claim:

1. A connecting device for connection to at least one elongate element to form a structure comprising: at least one connector member having a portion sized to engage with said elongate element said portion having at least one recess in a surface for mating with a surface on said elongate element; and a bonding insert mechanically fixable in said recess and proportioned to be held in said recess by said mating surface of said elongate member; said bonding insert including a base made of material compatible with the material of said elongate element, and an upper layer of a bonding medium disposed on said base; whereby upon application of heat to said portion of said connector member and elongate element, the bonding medium bonds the base of said bonding insert to the surface of said elongate element.

2. A connecting device as claimed in claim 1, in which said bonding medium is an adhesive.

3. A connecting device as claimed in claim 1, in which said bonding medium is a solder.

4. A connecting device as claimed in claim 1 wherein said bonding insert is a press-fit in said recess.

5. A connecting device as claimed in claim 1 wherein said bonding insert includes means for mechanically securing said insert in said recess.

6. A connecting device as claimed in claim 5, wherein said means for mechanically securing said insert in said recess includes a plurality of serrations for securing the insert in position.

7. A connecting device as claimed in claim 1, wherein biasing means are provided to assist in the engagement of said insert with the surface of the elongate element being bonded.

8. A connecting device for connection to at least one elongate element to form a structure, said device comprising a body of a material which differs from the material of the elongate element and a connector member sized to engage with said elongate element; said connector member having a recess; and a welding insert fixable in said recess, said welding insert being made of a material compatible with the material of said elongate element and being weldable thereto by fusion welding.

9. A connecting device for connection to at least a first elongate element and a second elongate element to form a structure comprising:

a first connector member having a portion sized to engage with said first elongate element to be connected, said portion having at least one recess in a surface for mating with a surface on said first elongate element; and a bonding insert mechanically fixable in said recess and proportioned to be held in said recess by said mating surface of said first elongate member; said bonding insert including a base made of material compatible with the material of said first elongate element, and an upper layer of bonding medium disposed on said base, whereby upon application of heat to said portion of said connector member and first elongate element, the bonding medium bonds the base of said bonding insert to the surface of said first elongate element; and a second connector member sized to engage with said second elongate element, said second connector member having a recess and a welding insert fixable in said recess, said welding insert being made of a material compatible with the material of said second elongate element and being weldable thereon.

* * * * *